(12) United States Patent
Janssens et al.

(10) Patent No.: US 11,359,695 B2
(45) Date of Patent: Jun. 14, 2022

(54) UNIVERSAL CABLE ATTACHMENT

(71) Applicant: COMMSCOPE CONNECTIVITY BELGIUM BVBA, Kessel-Lo (BE)

(72) Inventors: Thierry Janssens, Kessel-Lo (BE); Kurt Cornelissen, Hulshout (BE); Ronnie Rosa Georges Liefsoens, Tessenderlo (BE)

(73) Assignee: ComScope Connectivity Belgium BVBA, Kessel-Lo (BE)

( * ) Notice: Subject to any disclaimer, the term of this patent is extended or adjusted under 35 U.S.C. 154(b) by 416 days.

(21) Appl. No.: 16/092,418

(22) PCT Filed: Apr. 11, 2017

(86) PCT No.: PCT/EP2017/058588
§ 371 (c)(1),
(2) Date: Oct. 9, 2018

(87) PCT Pub. No.: WO2017/178446
PCT Pub. Date: Oct. 19, 2017

(65) Prior Publication Data
US 2020/0325961 A1    Oct. 15, 2020

Related U.S. Application Data

(60) Provisional application No. 62/320,979, filed on Apr. 11, 2016.

(51) Int. Cl.
*F16G 11/10* (2006.01)
*H02G 15/00* (2006.01)

(52) U.S. Cl.
CPC .......... *F16G 11/108* (2013.01); *F16G 11/106* (2013.01); *H02G 15/00* (2013.01)

(58) Field of Classification Search
CPC ..... F16G 11/106; F16G 11/108; H02G 15/00; H04Q 1/06
See application file for complete search history.

(56) References Cited

U.S. PATENT DOCUMENTS 1,058,577 A * 4/1913 Gardner .................. E21B 19/10
188/67
2,488,709 A * 11/1949 Colwell .................... B66C 1/48
24/498

(Continued)

FOREIGN PATENT DOCUMENTS

GB          892 797 A     3/1962
JP          H11-89031 A   3/1999

OTHER PUBLICATIONS

International Search Report and Written Opinion of the International Searching Authority for International Patent Application No. PCT/EP2017/058588 dated Jul. 11, 2017, 11 pages.

(Continued)

*Primary Examiner* — David M Upchurch
(74) *Attorney, Agent, or Firm* — Merchant & Gould P.C.

(57) ABSTRACT

Universal cable attachments for securing a cable in a secured position utilize a pair of counter-rotating lobes or one lobe and a counter surface to clamp against the cable. The lobes are configured such that they can accept a variety of cable diameters, thus eliminating the need for the provision of multiple sizes of unique cable attachments in certain applications. The lobes are configured such that they provide little or no resistance to a cable being inserted in an insertion direction and such that they lock against the cable when the cable is pulled in the opposite direction. The lobes may have eccentrically oriented tapered channels to accomplish the clamping function The lobes may include a plurality of differently sized plates to accomplish the clamping function.

17 Claims, 16 Drawing Sheets

(56) References Cited

U.S. PATENT DOCUMENTS

| | | | | |
|---|---|---|---|---|
| 2,794,537 | A * | 6/1957 | Holliday | A01D 45/16 198/867.15 |
| 3,265,032 | A * | 8/1966 | Hume | B63B 21/08 114/218 |
| 3,389,765 | A | 6/1968 | Pressley, Sr. | |
| 3,765,061 | A | 10/1973 | Nash | |
| 4,084,532 | A * | 4/1978 | Feder | B63B 21/08 114/218 |
| 4,092,941 | A * | 6/1978 | Gryglas | B63B 21/08 114/218 |
| 4,126,918 | A | 11/1978 | Cornell | |
| 4,453,486 | A * | 6/1984 | Harken | B63B 21/08 114/218 |
| 4,708,432 | A | 11/1987 | Berg | |
| 4,766,835 | A | 8/1988 | Randall et al. | |
| 4,830,340 | A * | 5/1989 | Knitig | B60P 7/0823 182/5 |
| 4,843,687 | A | 7/1989 | Kroepelin, Jr. | |
| 5,133,111 | A * | 7/1992 | Brown | F16G 11/106 24/132 WL |
| 5,548,873 | A * | 8/1996 | Macias | F16G 11/106 24/115 G |
| 5,921,353 | A * | 7/1999 | Day | B66C 1/12 188/65.3 |
| 6,418,592 | B1 * | 7/2002 | Mohtasham | F16G 11/106 24/134 L |
| 6,932,312 | B1 * | 8/2005 | Chen | B25B 5/06 211/60.1 |
| 6,986,607 | B2 | 1/2006 | Roth et al. | |
| 7,337,504 | B1 * | 3/2008 | Casey | B63B 21/08 114/218 |
| 9,421,618 | B1 * | 8/2016 | Brennan | H02G 15/007 |
| 9,611,875 | B2 * | 4/2017 | Likosar | F16B 2/10 |
| 2006/0151762 | A1 * | 7/2006 | Robinson | F16G 11/106 254/245 |
| 2007/0137003 | A1 * | 6/2007 | Zebe | F16G 11/106 24/134 P |
| 2011/0229088 | A1 | 9/2011 | Isenhour et al. | |
| 2012/0049020 | A1 * | 3/2012 | Stock | B25H 3/04 248/206.5 |
| 2013/0020771 | A1 | 1/2013 | Vanhentenrijk et al. | |

OTHER PUBLICATIONS

SCG-8C18 Gel Splice Closure, Standard Recommended Procedure 206-431, Issue 2, pp. 1-12, Corning Cable Systems (Oct. 2012).

* cited by examiner

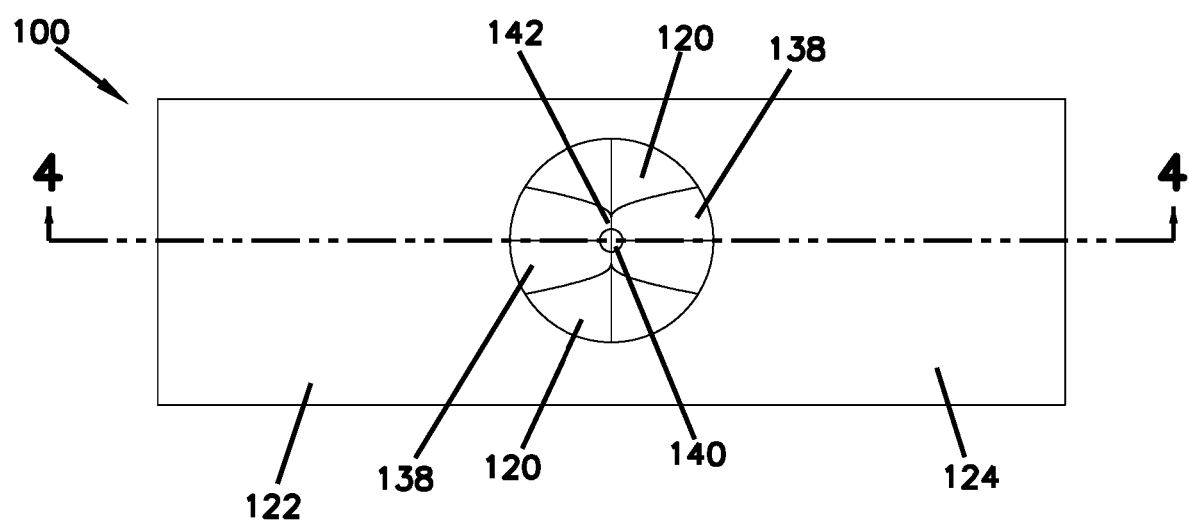

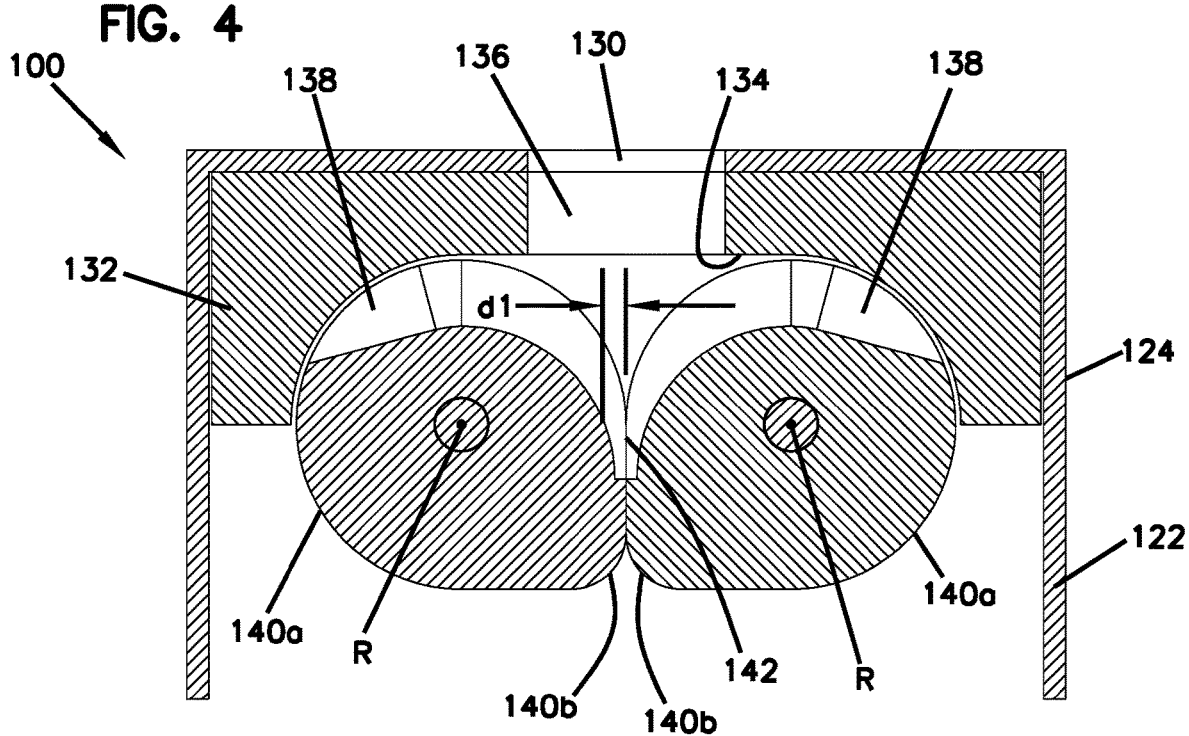
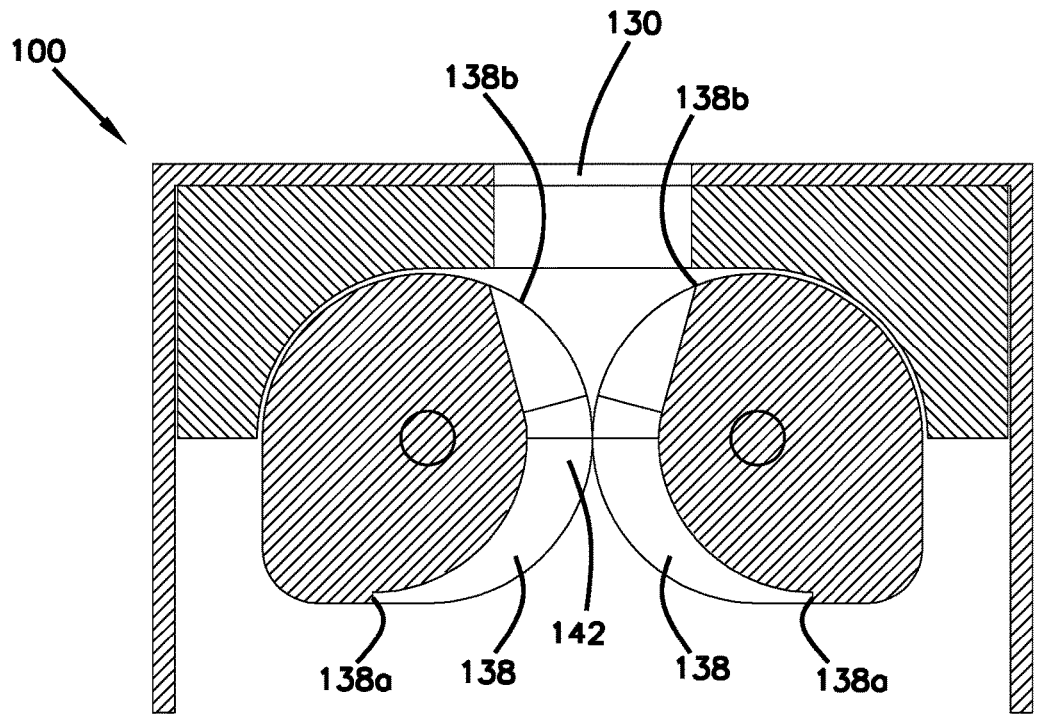

UNIVERSAL CABLE ATTACHMENT

CROSS-REFERENCE TO RELATED APPLICATION

This application is a National Stage of PCT/EP2017/058588, filed on Apr. 11, 2017, which claims the benefit of U.S. Patent Application Ser. No. 62/320,979, filed on Apr. 11, 2016, the disclosures of which are incorporated herein by reference in their entireties. To the extent appropriate, a claim of priority is made to each of the above disclosed applications.

TECHNICAL FIELD

The present disclosure relates to cable attachment systems, and particularly to cable attachment systems for use in telecommunications systems.

BACKGROUND

In many telecommunications applications, cables must be retained in a fixed position. It is often the case that cables of varying diameters are utilized within the same system. Many prior art cable attachment systems designed for this purpose are specific to the particular diameter of the cable to be retained. Accordingly, a single application may require many different cable attachment systems. Improvements are desired.

SUMMARY

Examples of universal cable attachments for securing a cable in a secured position are presented herein. In one example, the universal cable attachment includes a fixture, such as a housing to which first and second lobes are rotatably mounted. The first and second lobes respectively define first and second channels within a main body of the lobes. The second lobe is identical to the first lobe and is oppositely arranged with the first lobe such that the first channel faces the second channel to define a cable retaining space. The first and second lobes are counter-rotating and can be in direct contact with each other. In one aspect, the first and second lobes rotate in an insertion direction such that the cable retaining space increases in dimension. When the first and second lobes rotate in a clamping direction opposite the insertion direction, the cable retaining space decreases in dimension.

In one example, a universal cable attachment includes a fixture to which first and second lobes are mounted. The first lobe is rotatably mounted to the fixture and includes a first plate having a first open end. The second lobe is rotatably mounted to the fixture and includes a second plate having a second open end. The second lobe is identical to the first lobe and is oppositely arranged with the first lobe. When the first and second lobes rotate in an insertion direction, the first and second plate open ends rotate away from each other to allow a cable to be inserted past the first and second open ends. When the first and second lobes rotate in a clamping direction opposite the insertion direction, the first and second plate open ends rotate towards each other to clamp against an inserted cable.

A method of securing a cable is also presented, including the steps of inserting a cable in an insertion direction between a pair of contacting counter-rotating lobes, thereby causing the pair of lobes to rotate in an opening direction which allows the cable to be inserted past the pair of lobes without restriction until an imaginable end stop could be reached preventing, for example, cable grow-in; and pulling the cable in a clamping direction opposite the insertion direction to cause the pair of lobes to rotate in a direction opposite the opening direction and causing the pair of lobes to clamp against the cable to prevent the cable from being further pulled in the clamping direction.

Additional objects and advantages will be set forth in part in the description which follows, and in part will be obvious from the description, or may be learned by practice of the teachings presented herein. The objects and advantages will also be realized and attained by means of the elements and combinations particularly pointed out in the appended claims. It is to be understood that both the foregoing general description and the following detailed description are exemplary and explanatory only and are not restrictive of the claimed invention.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 3 is a top view of the universal cable attachment shown in FIG. 1.

FIG. 4 is a cross-sectional front view of the universal cable attachment shown in FIG. 1, taken along the line 4-4 in FIG. 3, wherein the lobes of the attachment are rotated into a first position.

FIG. 5 is a cross-sectional front view of the universal cable attachment shown in FIG. 1, taken along the line 4-4 in FIG. 3, wherein the lobes of the attachment are rotated into a second position.

DETAILED DESCRIPTION

Figure 1:
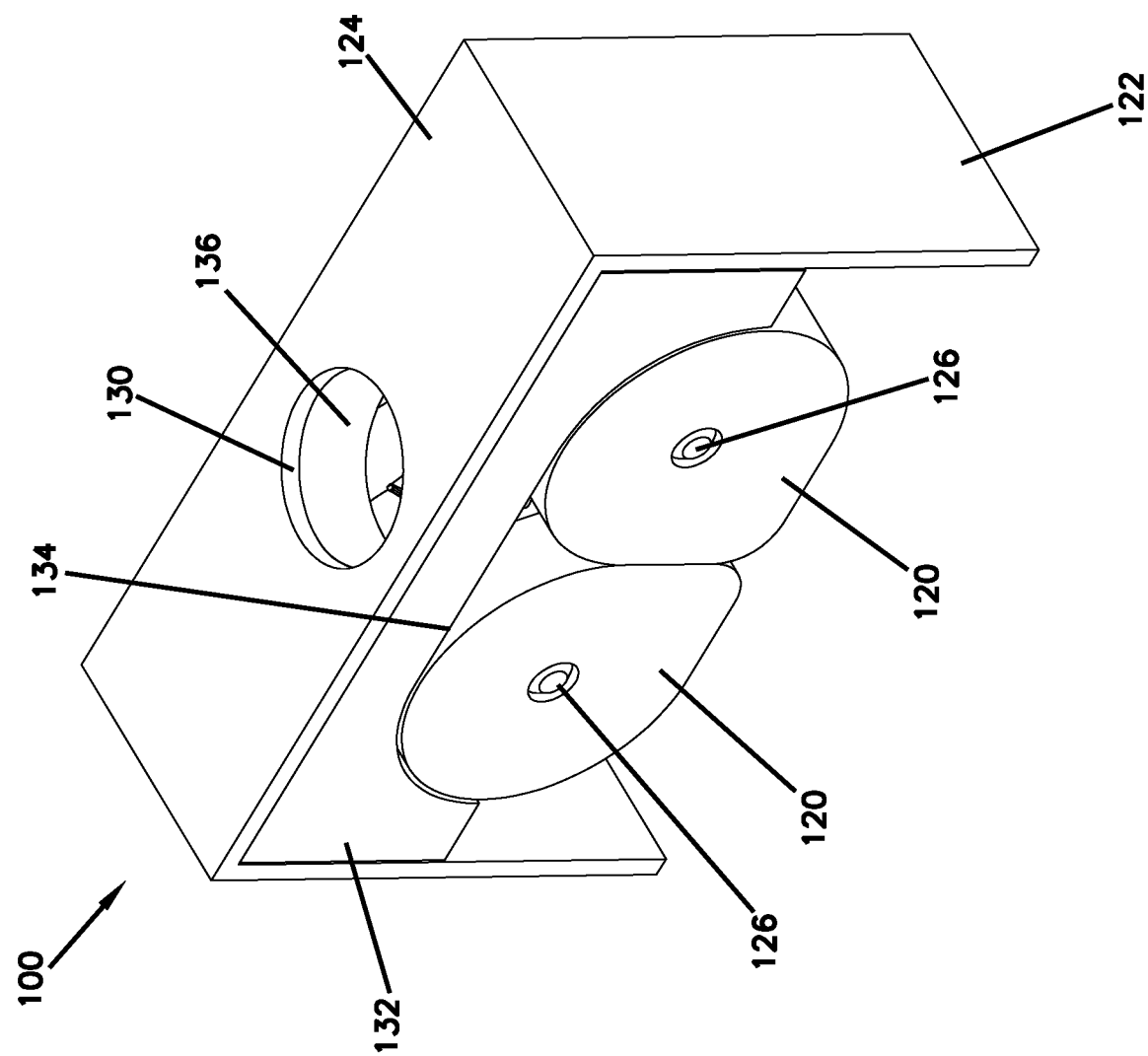
FIG. 1 is a perspective view of a first example of a universal cable attachment having features that are examples of aspects in accordance with the principles of the present disclosure.
Figure 2:
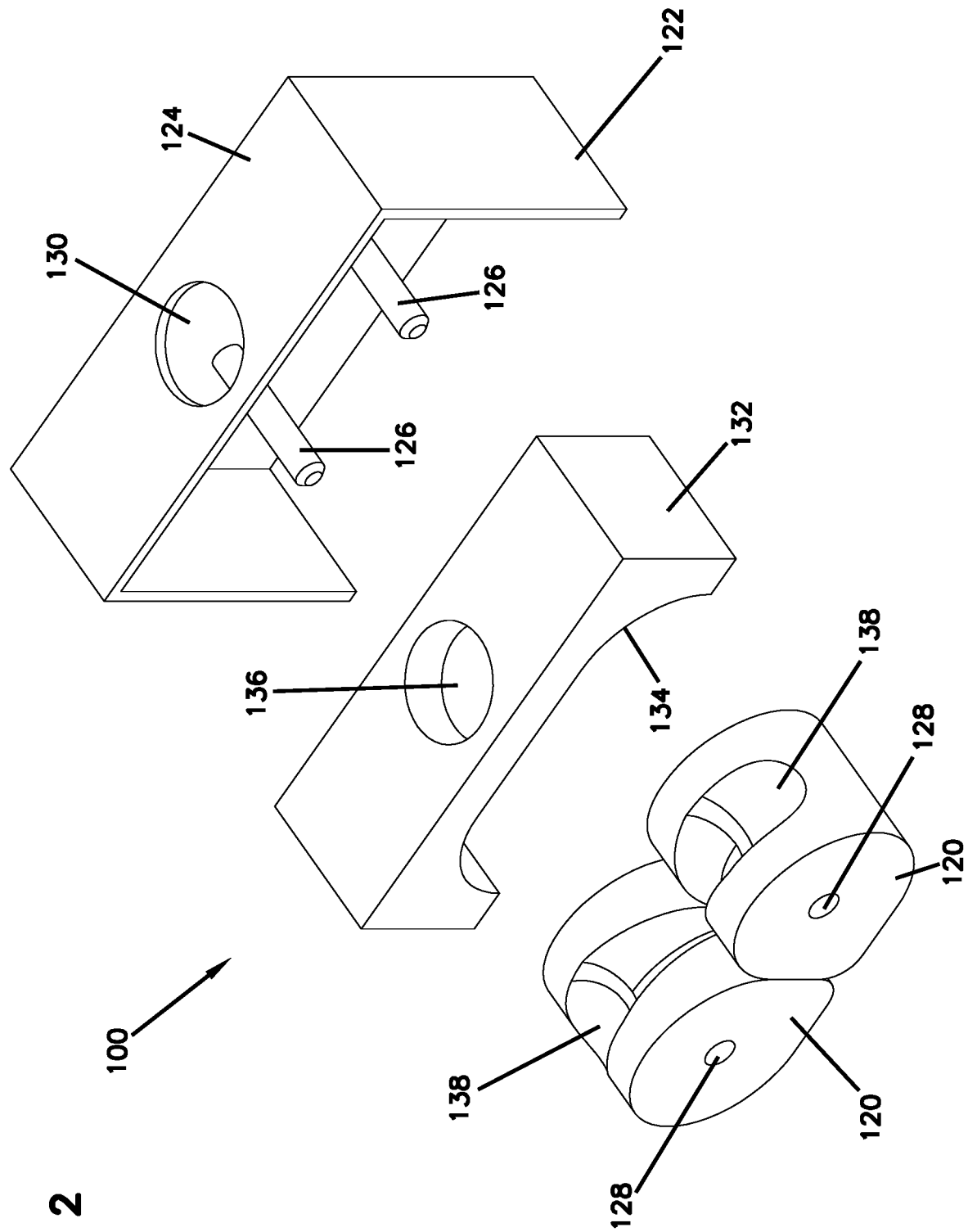
FIG. 2 is an exploded perspective view of the universal cable attachment shown in FIG. 1.
Figure 6:
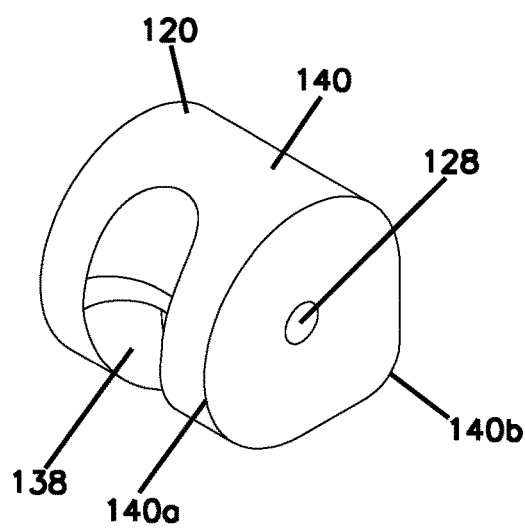
FIG. 6 is a top perspective view of a lobe of the universal cable attachment shown in FIG. 1.
Figure 7:
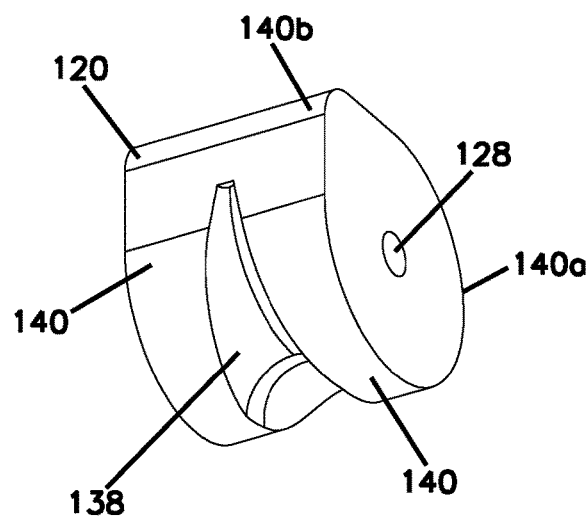
FIG. 7 is a bottom perspective view of a lobe of the universal cable attachment shown in FIG. 1.
Figure 8:
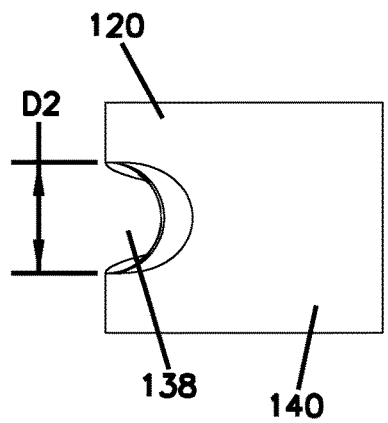
FIG. 8 is a top view of a lobe of the universal cable attachment shown in FIG. 1.
Figure 9:
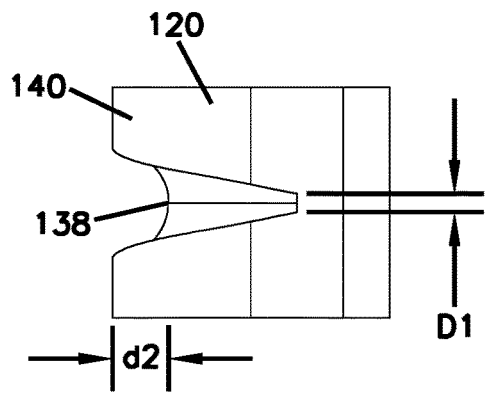
FIG. 9 is a bottom perspective view of a lobe of the universal cable attachment shown in FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In the drawings, examples of universal cable attachment assemblies 100, 200 are presented. The universal cable attachment assemblies 100, 200 provide for a way to perform cable termination (e.g. cable fixation, attachment, sealing, etc.) for variously sized cables such that variations in cable diameter are covered with a push-through insertion of the cable and a cable-retaining mechanism. As such, the problem of varying cable diameters is overcome by the universal cable attachment concept in a way that the range of diameters can be chosen which fits best the cable diameter. The universal cable attachment can have different embodiments without departing from the concepts presented herein and is not limited to the fixation of a cable. As will be explained in further detail below, continuously varying (e.g. universal cable attachment 100) or discrete (e.g. universal cable attachment 200) solutions can be chosen to accomplish same purpose of accommodating differently sized cables with the same universal cable attachment.

With reference to FIGS. 1-11, a first example of a universal cable attachment 100 is presented. The universal cable attachment 100 represents a "continuous" solution in which a pair of lobes 120 is provided, with each having a continuously tapered channel 138 to define an infinitely varying aperture to retain a certain cable diameter range. FIG. 11A shows an alternative configuration using a single "continuous" lobe 120 acting against a fixed counter surface 121 instead of dual-acting lobes 120. Due to the changing depth of the channel, the channel surface rotates eccentrically about a rotational axis of the lobe 120 when the lobe 120 is being rotated. By use of the term eccentric, it is meant that the distance between the rotational axis of the lobe and the bottommost portion of the channel increases along the length of the channel. In this specific configuration, a pair of identical and oppositely arranged lobes 120 is secured within a fixture 122. A shown, the fixture 122 is provided as a housing body 124 having a pair of extensions 126 to which the lobes 120 are rotatably mounted via apertures 128 in the lobes 120. The housing 124 also is shown as including an aperture 130 through which a cable to be secured can be inserted. To ensure that the cable is properly guided once the cable is inserted through aperture 130, a guide structure 132 can be provided within the housing and positioned between the aperture 130 and the lobes 120. As shown, the guide structure 132 includes a guide surface 134 adjacent the outer surface of the lobes 120 and an aperture 136 through which the cable can extend and be guided into the channels 138 of the lobes 120. Although the housing 124 is shown as being open on the front face, a panel can be provided to entirely enclose the lobes 120 and guide structure 132 within the interior cavity defined by the housing 124.

Referring to FIGS. 4-9, the details of each lobe 120 can be further seen. In one aspect, each lobe 120 has an outer surface 140 that defines a cam-type shape with a generally cylindrically-shaped portion 140a and a nose or elongated portion 140b. Accordingly, the outer surface 140 can be said to rotate eccentrically about the aperture 128 or an axis of rotation R. As can be seen at FIG. 4, the elongated portions 140b of each lobe 120 act as a stop against each other to prevent the lobes from rotating beyond the position shown in FIG. 4. That is, the elongated portions 140b prevent the left-hand lobe 120 from rotating any further in a counter-clockwise direction and the right-hand lobe 120 from rotating any further in a clockwise direction. In one aspect the outer surfaces 140 of the lobes 120 are in contact with each other such that when one lobe 120 rotates, the other lobe rotates a corresponding amount, but in an opposite direction. This contact ensures that alignment of the lobes 120 and channels 138 is maintained such that symmetry is always maintained. Once a cable is inserted into the channel 138 such that the cable contacts both of the channels, this alignment can be additionally maintained by virtue of the cable contacting similar or corresponding portions of each lobe 120.

As most easily seen at FIGS. 4 and 5, the channel 138 of each lobe 120 extends from a first end 138a proximate lobe portion 140b to a second end 138b away from or opposite the lobe portion 140b. The channel 138 is continuously tapered in a width-wise direction and in a depth-wise direction such that the channel 138 has a greater depth and width at the second end 138b as compared to the first end 138a. Thus the channel 138 has a first width D1 and first depth d1 at the first end 138a that is less than a corresponding second width D2 and second depth d2 at the second end 138b. Once the lobes 120 are mounted into the housing body 124, the channels 138 face each other and define an interstitial or cable retaining space 142 which is generally located between the rotational axes R of the lobes 120. When the lobes rotate together in an opening direction (i.e. the left-hand lobe rotates in a clockwise direction and the right-hand lobe rotates in a counterclockwise direction), the dimension of the space 142 is continuously increased. When the lobes rotate together in a closing direction (i.e. the left-hand lobe rotates in a counterclockwise direction and the right-hand lobe rotates in a clockwise direction), the dimension of the space 142 is continuously decreased.

Figure 10:
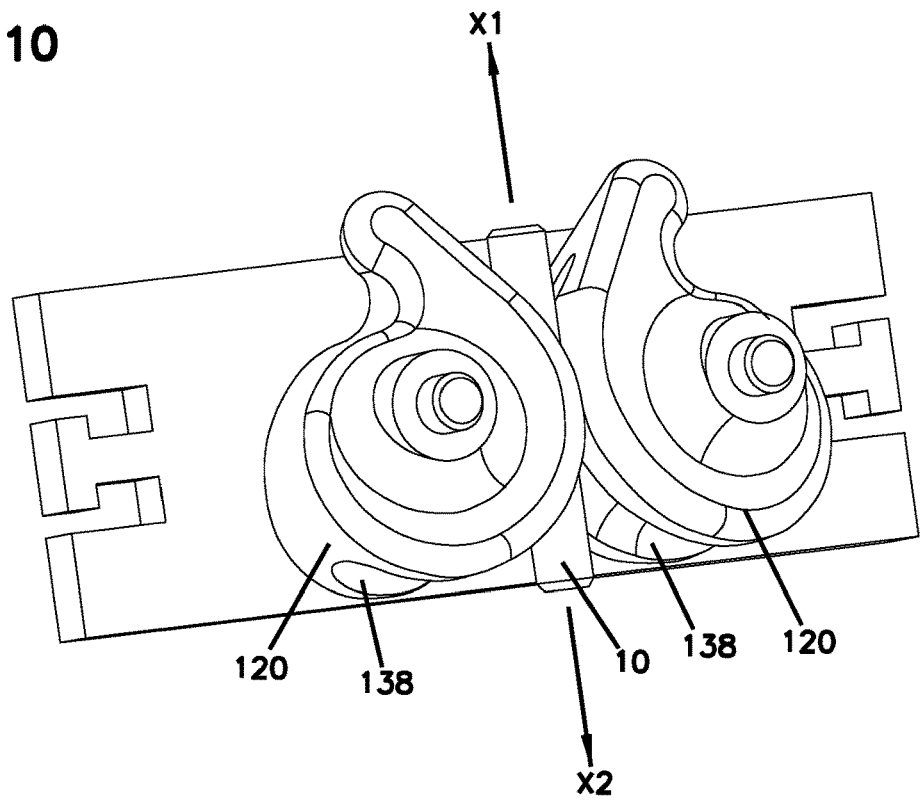
FIG. 10 is a perspective view of a schematic depiction of a portion of the universal cable attachment shown in FIG. 1 with a retained cable.
Figure 11:
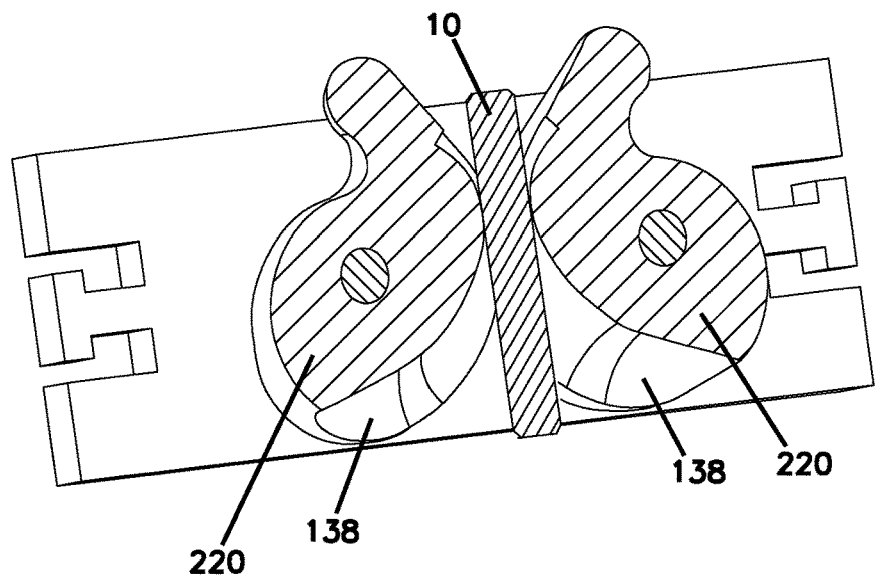
FIG. 11 is a cross-sectional perspective view of the schematic depiction of the universal cable attachment shown in FIG. 10.
Figure 11A:
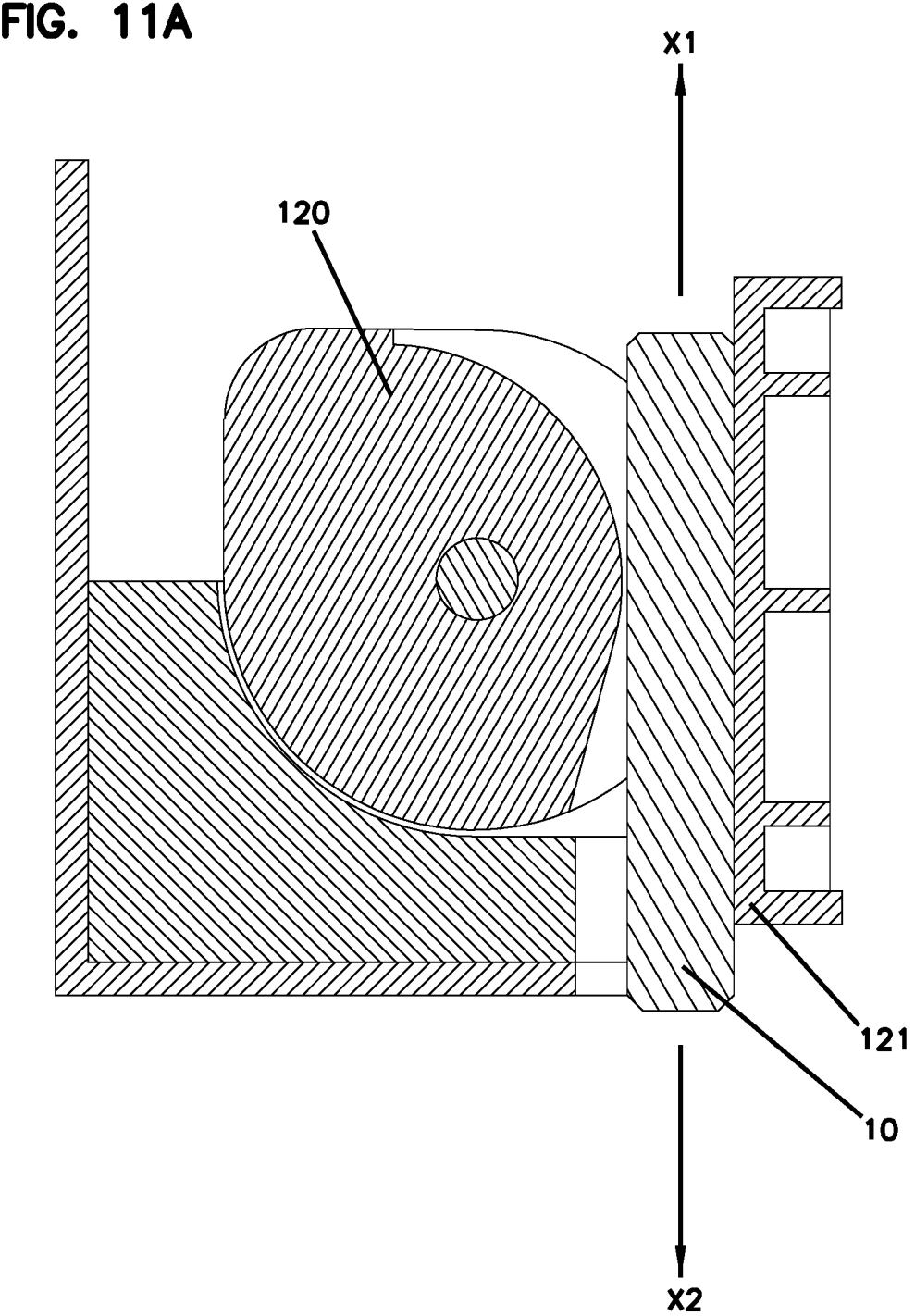
FIG. 11A is a cross-sectional perspective view of the schematic depiction of a lobe of the universal cable attachment shown in FIG. 1 with a cable being retained between the lobe in a second position and a surface.
Figure 12:
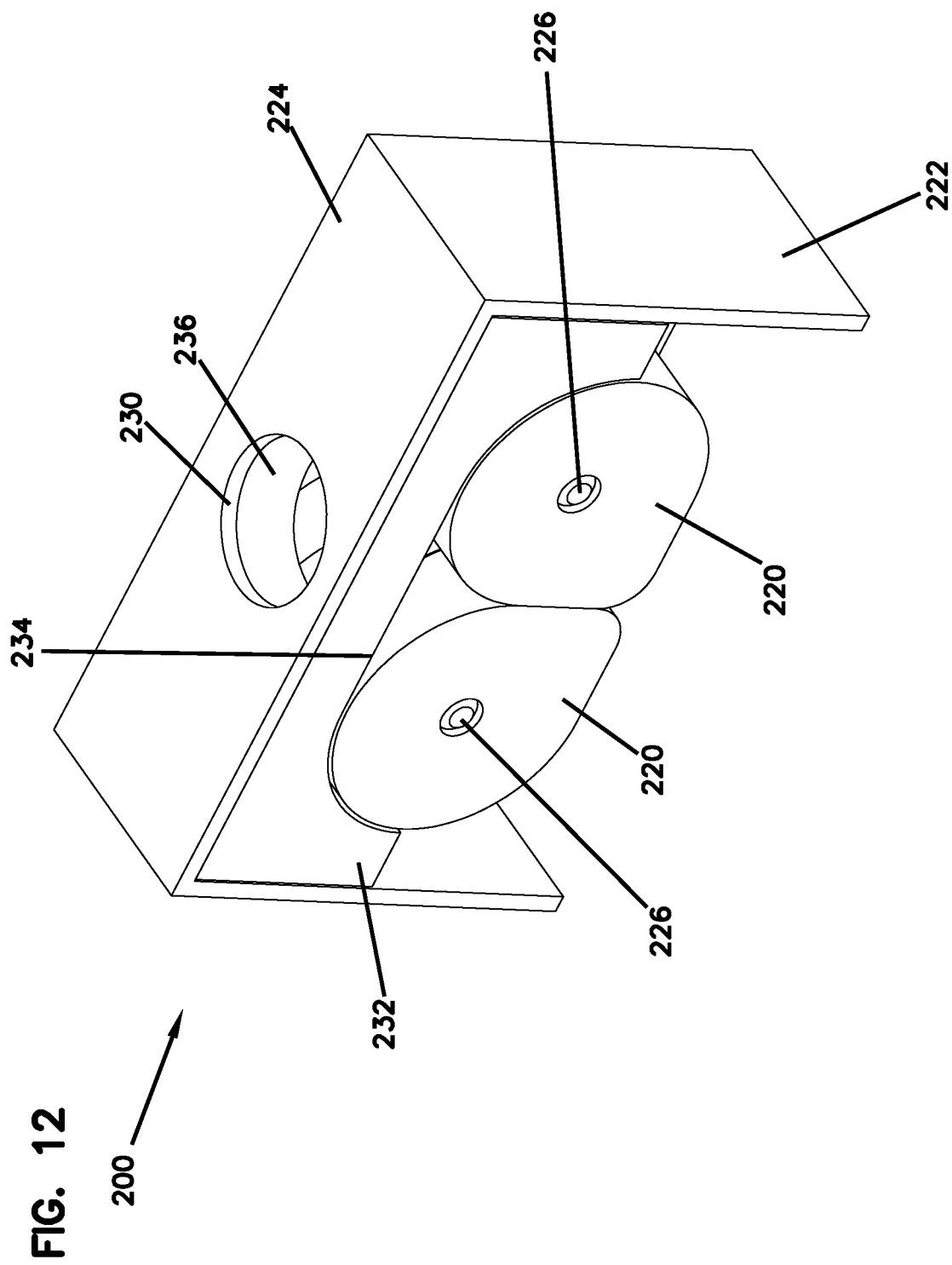
FIG. 12 is a perspective view of a second example of a universal cable attachment having features that are examples of aspects in accordance with the principles of the present disclosure.
Figure 13:
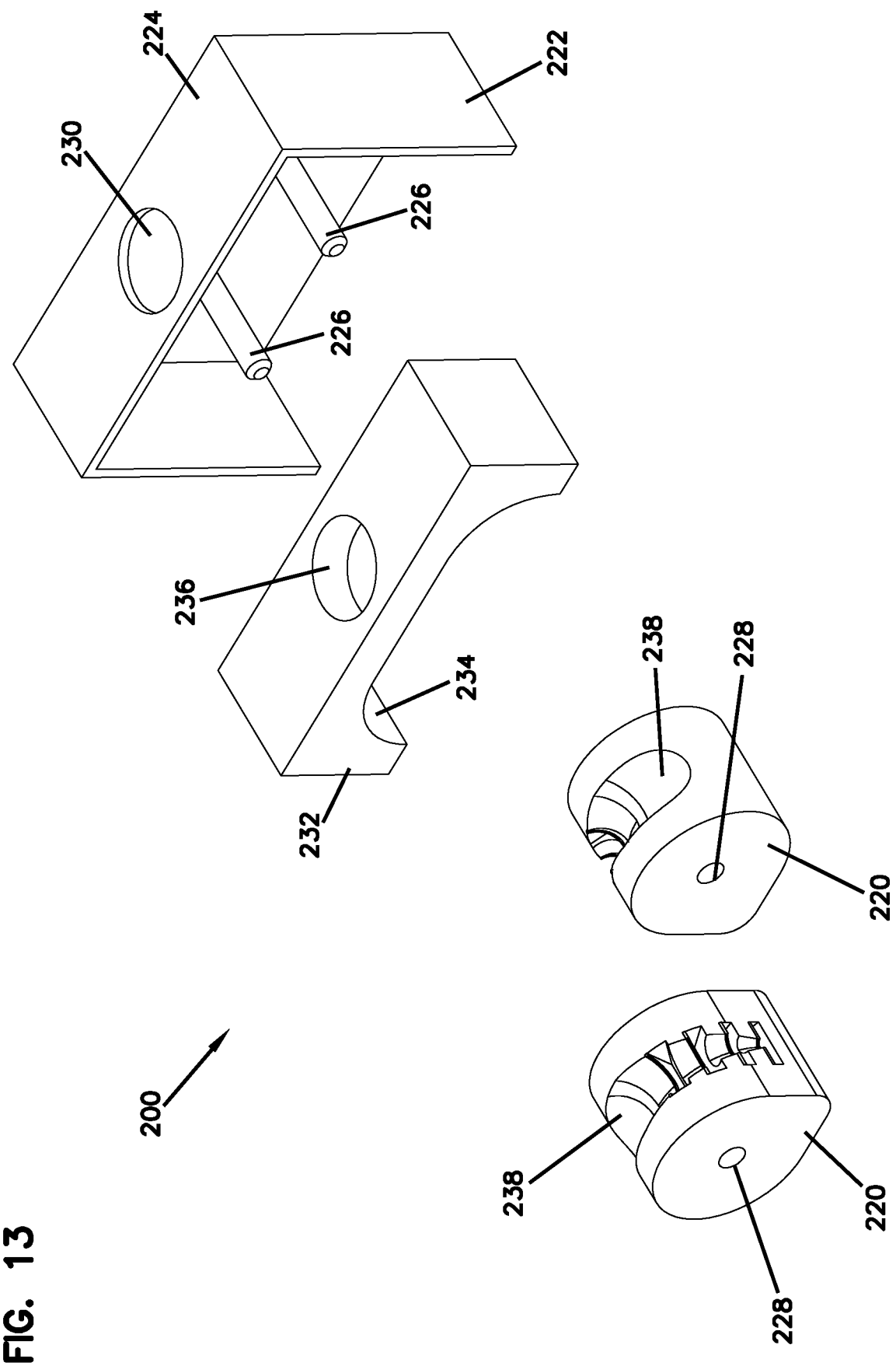
FIG. 13 is an exploded perspective view of the universal cable attachment shown in FIG. 12.
Figure 14:
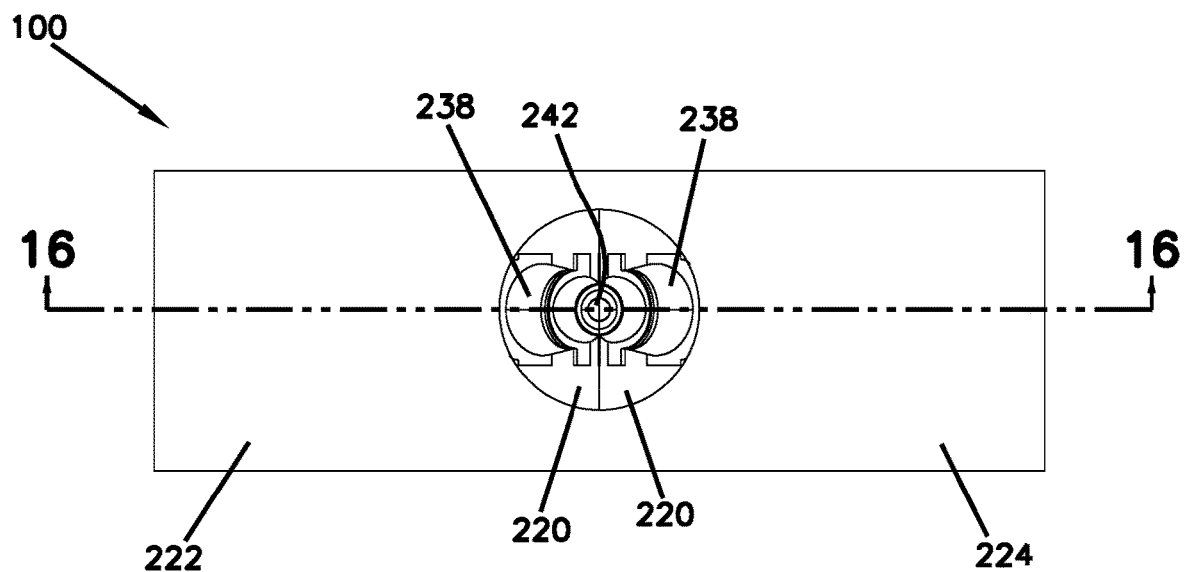
FIG. 14 is a top view of the universal cable attachment shown in FIG. 12 wherein the lobes of the attachment are rotated into a first position.
Figure 15:
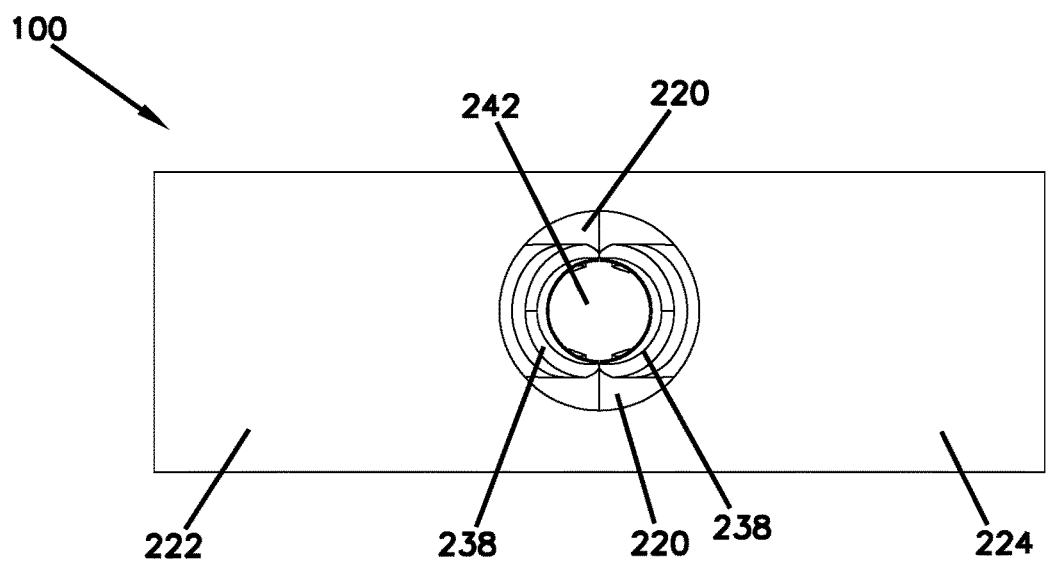
FIG. 15 is a top view of the universal cable attachment shown in FIG. 12 wherein the lobes of the attachment are rotated into a fourth position.
Figure 16:
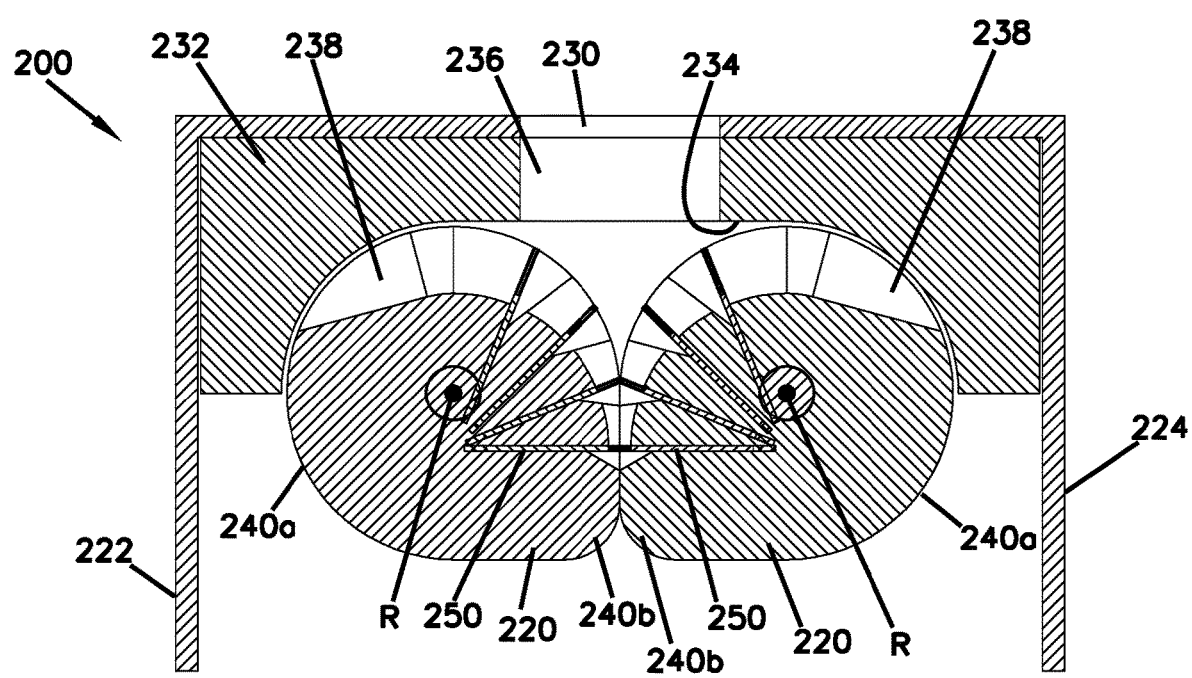
FIG. 16 is a cross-sectional front view of the universal cable attachment shown in FIG. 12, taken along the line 16-16 in FIG. 14, wherein the lobes of the attachment are rotated into the first position.

In operation, and as can be seen schematically at FIGS. 10 and 11, a cable 10 is first inserted in an insertion direction X1 into and through apertures 130, 136 and into the space 142 which is coaxially aligned with the apertures 130, 136. It is noted that FIG. 11A shows an alternate arrangement in which a single lobe 120 is utilized and the cable 10 is inserted between the lobe 120 and a fixed counter surface 121. As the cable continues to be inserted, the end and sides of the cable 10 contact the channels 138 of the lobes and cause the lobes 120 to rotate in the opening direction until the space 142 achieves the same dimension as the diameter of the cable 10. At this point, the sides of the cable 10 glide past the channels until the operator determines that a desired amount of cable has been inserted or an end stop is reached. To secure the cable within the universal cable attachment 100, the operator pulls the cable 10 in a clamping direction X2 which is opposite the insertion direction X1. As the channels 138 have remained in contact with the sides of the cable 10, the lobes 120 begin to rotate in the closing direction due to friction between the cable 10 and the channels 138. The lobes 120 could also be provided with springs to bias the lobes 120 to rotate in the clamping direction which would further aid in the lobes 120 engaging the cable 10 when the cable 10 is pulled in the clamping direction X2. As the dimension of the space 142 decreases as the lobes 120 rotate in the closing direction, the lobes 120 generate increasing pressure onto the cable 10 and ultimately prevent the cable 10 from being pulled any further in the clamping direction X2. Thus, greater tension on the cable 10 in the clamping direction X2 results in a greater clamping force exerted on the cable 10 by the channels 138 of the lobes 120. Once this condition is reached, the cable 10 can be characterized as being in an attached or secured position. This securing action could also be referred to as a self-locking or self-retaining feature, achieved by pull or spring loaded lobes, or by other means. Additionally, the cable 10 is also sealed against the channels 138 in this position and the cable 10 can also be characterized as being in sealed condition since the interface between the channels and the cable 10 is essentially fluid tight. If it is desired to remove the cable 10 from the universal cable attachment 100, the operator can push the cable 10 in the insertion direction X1 to unclamp the cable 10 and then hold the lobes 120 such that they cannot rotate in the closing direction while simultaneously pulling the cable 10 in the clamping direction X2.

In one aspect, the minimum and maximum width and depth of the tapering channels 138 can be selected such that the universal cable attachment 100 is able to secure any cable 10 having a diameter between a selected range of sizes or between a minimum and maximum size. In the example shown, the lobes 120 and channels 138 are configured such that any cable having a diameter between 2 millimeters and 12 millimeters can be secured and sealed by the universal cable attachment 100. Thus, it is apparent that universal cable attachments 100 can be provided that can be used to secure and seal many different cable sizes, thereby allowing for fewer required unique attachment systems in any given application.

Referring to 12-29, a second example of a universal cable attachment 200 is shown. This second example shares many features in common with the first example of the universal cable attachment 100. Accordingly, the description for the universal cable attachment 100 is applicable to this second example. Accordingly, like references numbers will be used for like features, but with a different series number (e.g. 200 instead of 100). The description for the universal cable attachment 200 will be limited to those features that are different from the universal cable attachment 100. The two examples are similar in that they both employ a housing body 124, 224 within which a guide structure 132, 232 is provided, and in that a pair of contacting counter-rotating lobes 120, 220 is provided. However, the lobes 220 of the second example are provided with a different design, as discussed below.

The lobes 220 of the universal cable attachment 200 are configured differently than the lobes 120 provide for a "discrete" solution in which cables of certain diameters are secured at discrete rotational positions of the lobes 120. This is in contrast to the infinite number of cable diameters between a selected minimum and maximum diameter that can be secured by the "continuous" solution of the universal cable attachment 100. However, the lobes 220 can be configured such that multiple cable sizes can be secured at each discrete location such that all standard cable sizes between a minimum and maximum diameter can also be secured. This is accomplished by providing lobes 220 that have sets of stepwise plates 250 mounted in an eccentric fashion in which each plate 250 can retain a certain cable diameter range, each range overlapping each other with a certain portion such that a large range cable diameters can be secured. Alternatively, each plate 250 can be configured to secure only a single cable size. The eccentricity of the plates 250 can be accomplished by mounting similar plates 250 a different distance from the axis of rotation and/or by providing differently configured plates 250 that define an eccentric line along a common point of each plate 250. This configuration allows a different clamping force in function of the cable diameter pertaining to its required retaining force.

Figure 27:
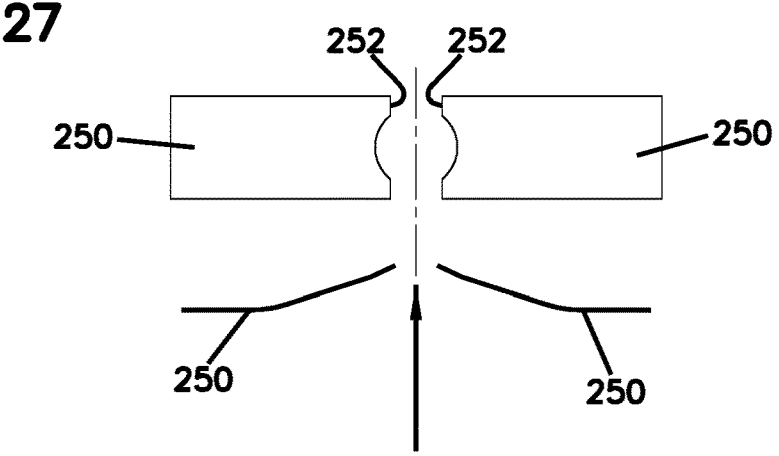
FIG. 27 is a schematic top and side view of a pair of plates that can be utilized with the lobe shown in FIG. 21, the end plates having open ends sized for a first range of cables.
Figure 28:
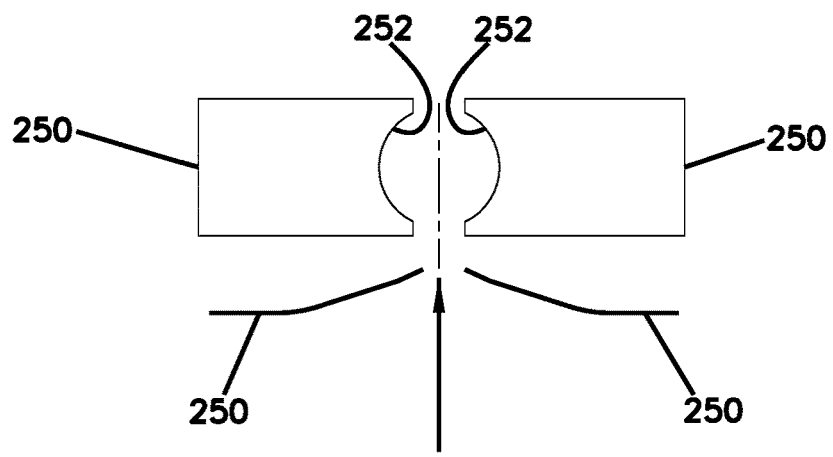
FIG. 28 is a schematic top and side view of a pair of plates that can be utilized with the lobe shown in FIG. 21, the end plates having open ends sized for a second range of cables.
Figure 29:
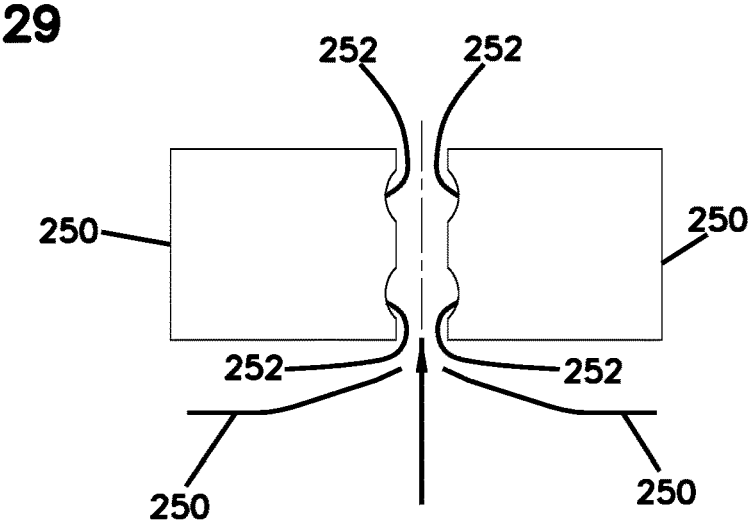
FIG. 29 is a schematic top and side view of a pair of plates that can be utilized with the lobe shown in FIG. 21, the end plates having multiple open ends for securing a plurality of cables.

The plates 250 are most easily viewable at FIGS. 16-20. As presented, four plates 250a, 250b, 250c, 250d are provided within a channel 238 of each lobe 220. However, fewer or more plates 250 can be provided. Additionally, the plates 250 can be provided as a separate component, such as a metal component, that is attached or molded into the lobe 220 or can be provided as an integral portion of the lobe 220. As shown, each plate 250 is provided with an open end 252 having a generally semicircular shape, wherein the open end 252 of each plate has a different dimension from that of the other plates. Although a generally semicircular shape is shown, other shapes are possible, for example, oblong and rectangular shapes. As the lobes 220 rotate together, the open ends 252 of corresponding plates orient to define the cable retaining space 242 through which the cable 10 can extend. The exact position of the plates 250 and open ends 252 will be determined to some extent by the particular diameter of the cable being secured. Thus, the plates 250 may be either parallel or aligned at an oblique angle to each other when securing a cable. Additionally, as shown at FIGS. 27-29, the plates 250 may be provided with an angle or inclined portion to achieve a desired angle of the plate 250 at the open end 252 when the plate 250 is in the secured position against a cable 10.

In the particular embodiment shown, the open ends 252 are sequentially larger for each adjacent plate 250 farther away from the nose or elongated portion 240b. For example, the open end 252a of the plate 250a which is nearest nose portion 240b has an opening dimension D3 that is less than an opening dimension D4 of the open end 252b of the plate 250b, which is in turn less than an opening dimension D5 of the open end 252c of the plate 250c, which is in turn less than an opening dimension D6 of the open end 252d of the plate 250d. By selecting the opening dimensions, a desired range of cable diameters can be secured within the universal cable attachment 200. This concept is schematically shown at FIGS. 27 and 28, wherein FIG. 27 shows opposing plates 250 having open ends 252 sized for a first range of cable diameters and FIG. 28 shows opposing plates 250 having larger open ends 252 sized for a second range of cable diameters. The open ends 252 of the plates shown in FIG. 28 have a larger dimension than the open ends 252 of the plates shown in FIG. 27 to enable the plates of FIG. 28 to secure cables that are too large to be secured by the plates 250 shown in FIG. 27. In one example, the first and second ranges of cable diameters overlap such that a cable of a certain diameter within the overlap could be secured by either the plates of FIG. 27 or the plates of FIG. 28. FIG. 29 shows an alternative construction in which multiple open ends 252 are provided such that multiple cables 10 can be secured by the same pair of lobes 220. In the example shown, two open ends 252 are shown for each plate, however, more open ends can be provided as desired. In the example shown, the plates 250 and their open ends 252 are configured such that cables having a diameter between 2 millimeters and 9 millimeters can be secured by the universal cable attachment 100.

Figure 17:
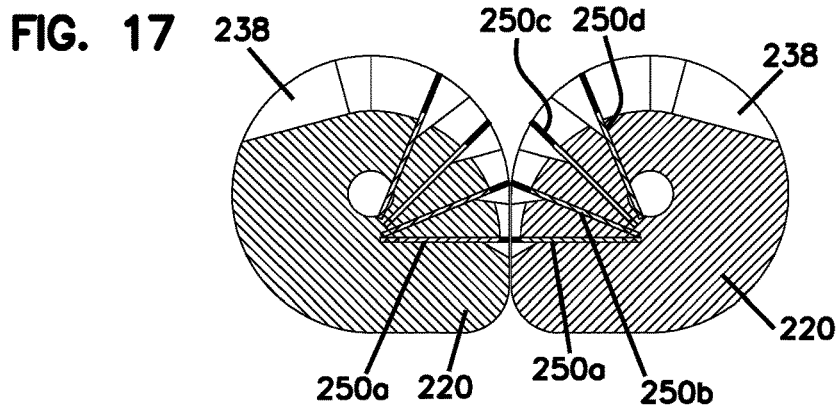
FIG. 17 is a cross-sectional front view of the lobes of the universal cable attachment shown in FIG. 12, wherein the lobes are shown in isolation from the rest of the assembly and rotated into the first position.
Figure 18:
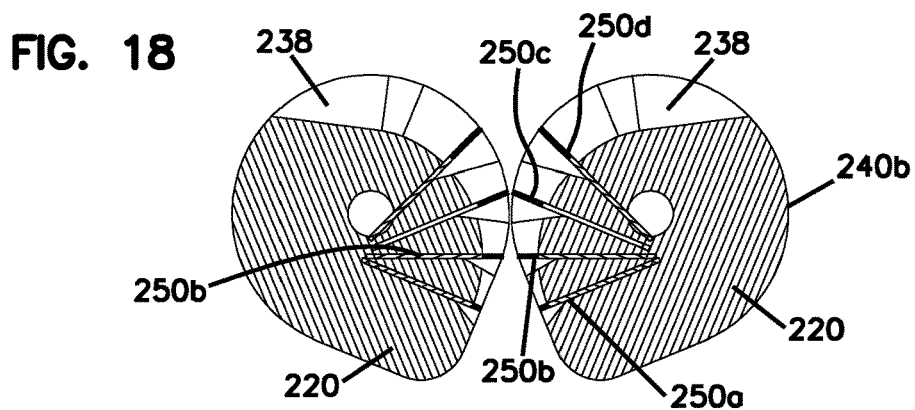
FIG. 18 is a cross-sectional front view of the lobes of the universal cable attachment shown in FIG. 12, wherein the lobes are shown in isolation from the rest of the assembly and rotated into a second position.
Figure 19:
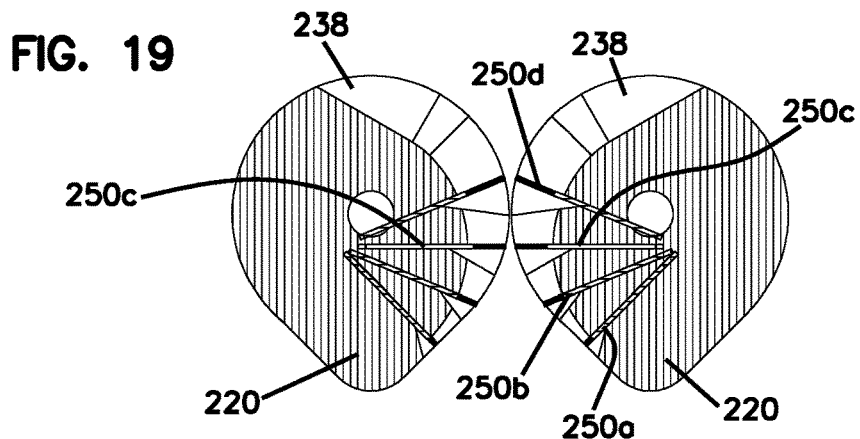
FIG. 19 is a cross-sectional front view of the lobes of the universal cable attachment shown in FIG. 12, wherein the lobes are shown in isolation from the rest of the assembly and rotated into a third position.
Figure 20:
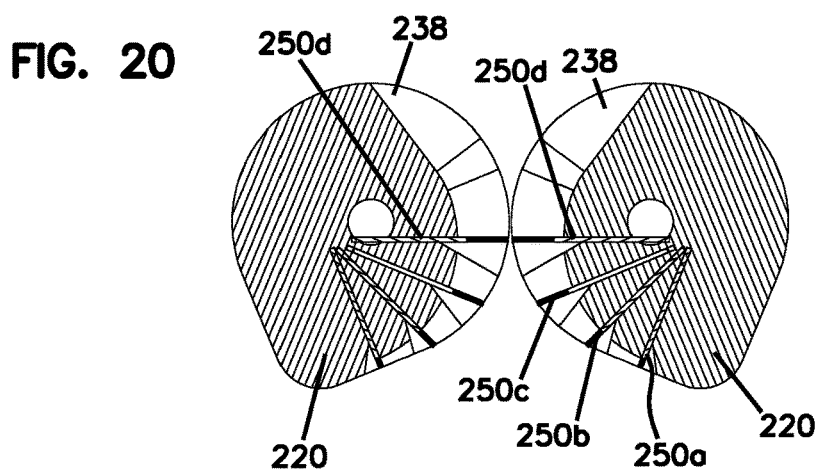
FIG. 20 is a cross-sectional front view of the lobes of the universal cable attachment shown in FIG. 12, wherein the lobes are shown in isolation from the rest of the assembly and rotated into the fourth position.
Figure 21:
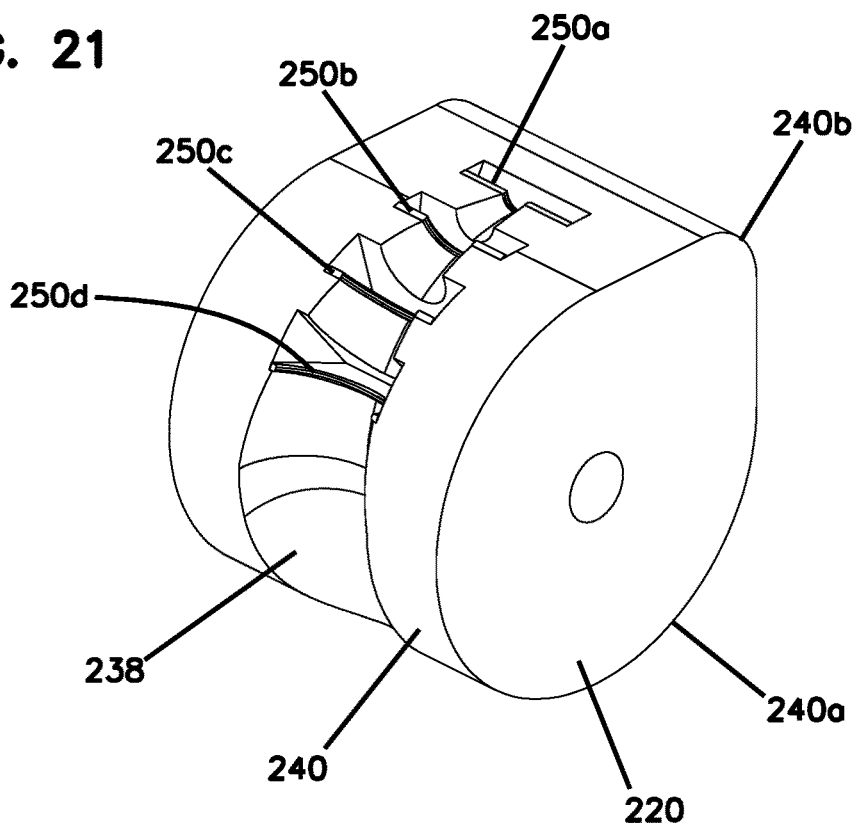
FIG. 21 is a top perspective view of a lobe of the universal cable attachment shown in FIG. 12.
Figure 22:
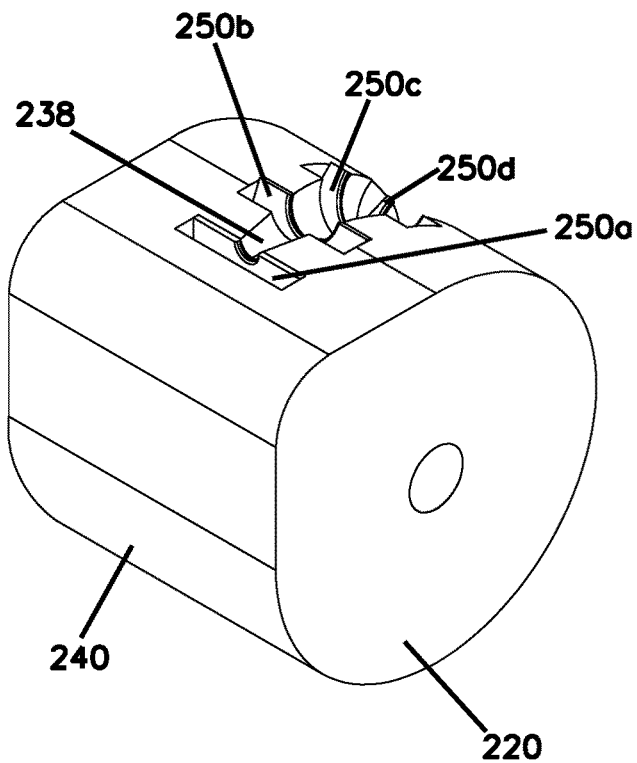
FIG. 22 is a bottom perspective view of a lobe of the universal cable attachment shown in FIG. 12.
Figure 23:
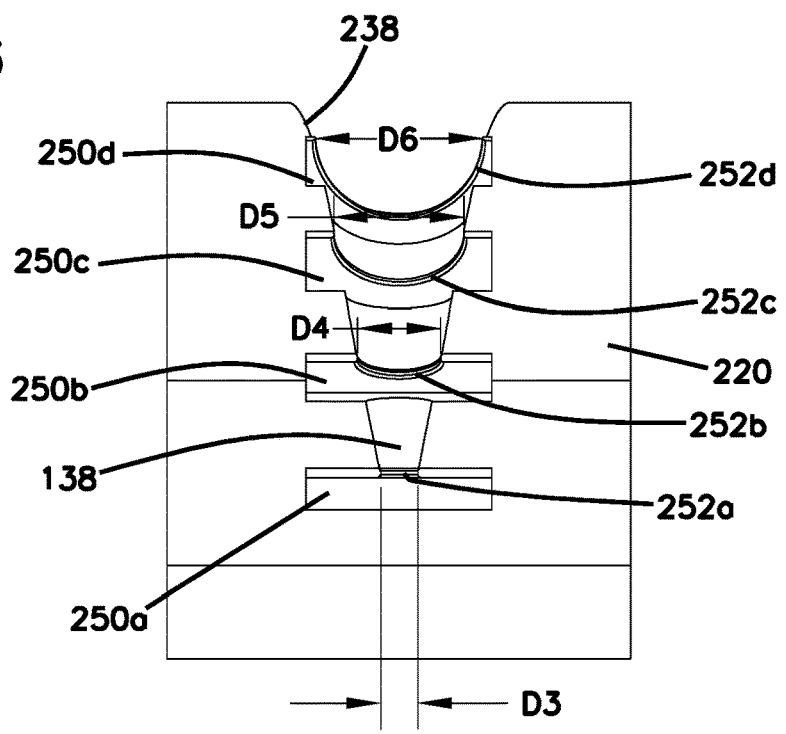
FIG. 23 is a front view of the lobe shown in FIG. 21.
Figure 24:
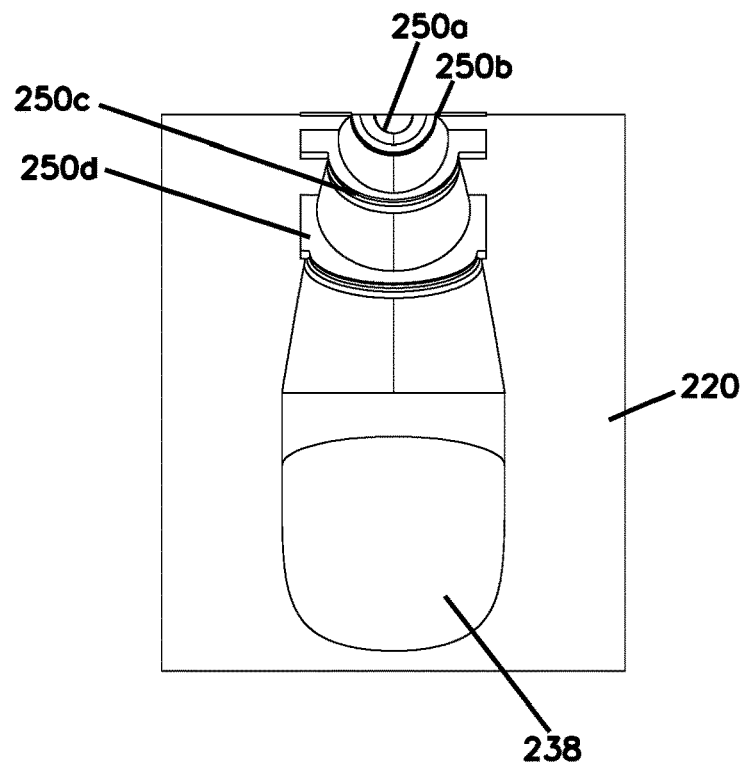
FIG. 24 is a bottom view of the lobe shown in FIG. 21.

With reference to FIGS. 17 to 20, it can be seen that the plates 250 of each lobe 220 align with each other as the lobes rotate in the opening and clamping directions. For example, FIG. 17 shows a rotational position in which the plates 250a of each lobe 220 are oriented in a potential first clamping position with each other such that the open ends 252a define the retaining space 242. FIG. 18 shows a rotational position in which the plates 250b of each lobe 220 are oriented in a potential second clamping position with each other such that the open ends 252b define the retaining space 242. FIG. 19 shows a rotational position in which the plates 250c of each lobe 220 are oriented in a potential third clamping position with each other such that the open ends 252c define the retaining space 242. FIG. 20 shows a rotational position in which the plates 250d of each lobe 220 are oriented in a potential fourth clamping position with each other such that the open ends 252d define the retaining space 242.

Figure 25:
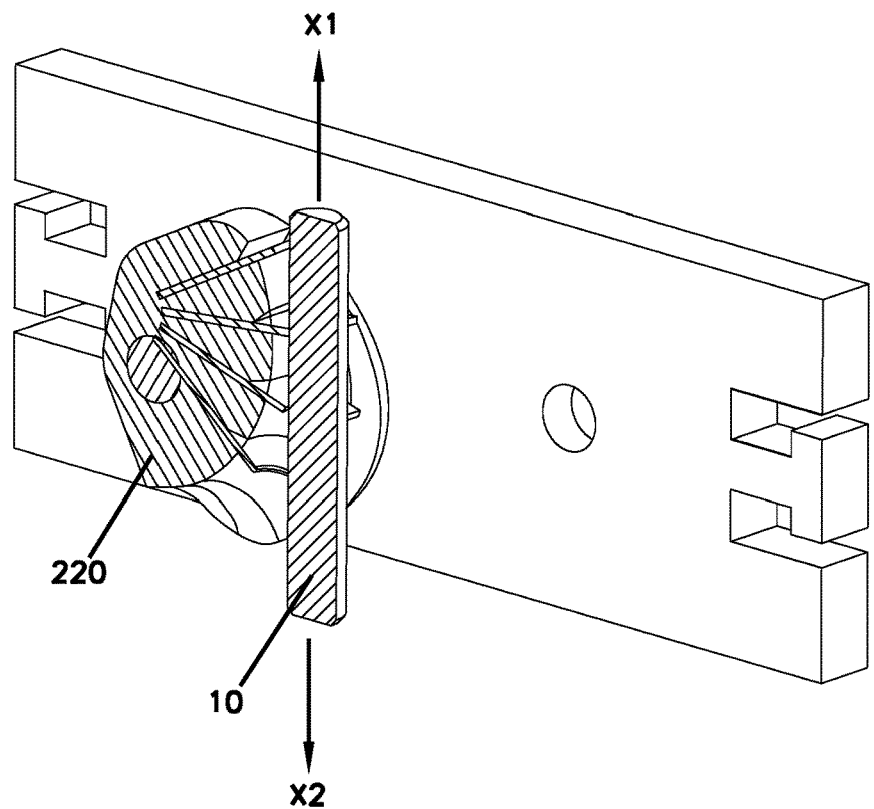
FIG. 25 is a cross-sectional perspective view of a schematic depiction of a portion of the universal cable attachment shown in FIG. 12 with a retained cable.
Figure 26:
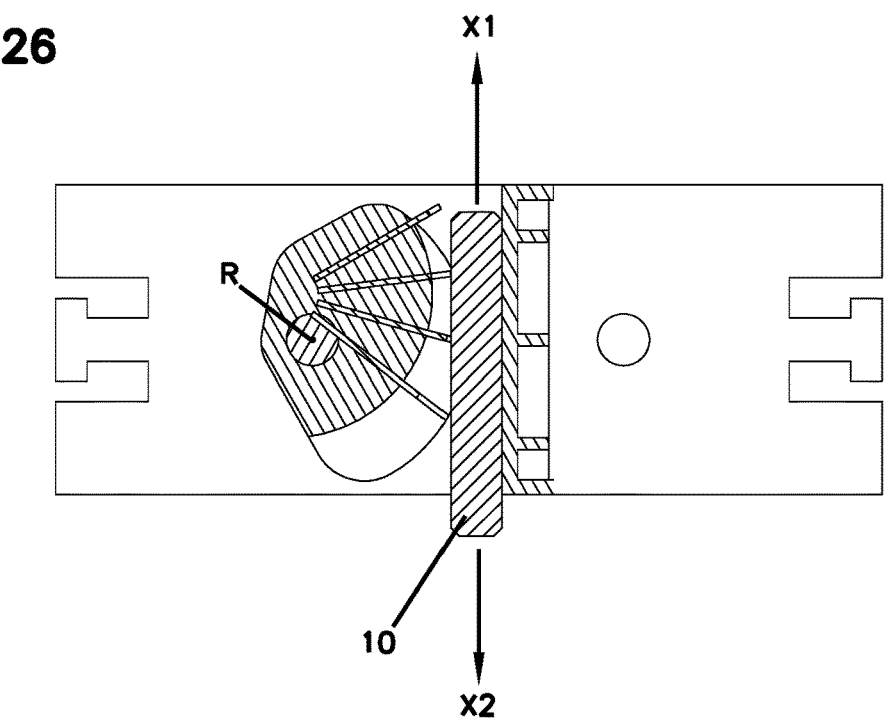
FIG. 26 is a cross-sectional perspective view of the schematic depiction of a lobe of the universal cable attachment shown in FIG. 12 with a cable being retained between the lobe in a second position and a surface.

In operation, and as can be seen schematically at FIGS. 25 and 26, a cable 10 is first inserted in an insertion direction X1 into and through apertures 230, 236 and into the space 242 defined between the plates 250. It is noted that FIG. 25 only shows one of the lobes 220 for the purpose of clarity, while FIG. 26 shows an alternative arrangement in which a single lobe 220 is utilized and the cable 10 is inserted between the lobe 220 and a fixed counter surface 221. As the cable 10 continues to be inserted, the end and sides of the cable 10 eventually contact one of the plates 250 and cause the lobes 220 to rotate in the opening direction, thereby providing little or no resistance to the cable 10 during insertion.

To secure the cable 10 within the universal cable attachment 200, the operator pulls the cable 10 in the clamping direction X2. The plates 250 are spaced such that at least one pair of plates will always be in contact with the cable 10. Thus, when the cable 10 is pulled in the clamping direction X2, the plates 250 in contact with the cable 10 will cause the lobes 220 to rotate in the closing direction. The lobes 220 could also be provided with springs to bias the lobes 220 to rotate in the clamping direction which would further aid in the lobe plates 250 engaging the cable 10 when the cable 10 is pulled in the clamping direction X2. As the lobes 220 rotate, the plates 250 having an open end dimension greater than the cable diameter will rotate past the cable. However, once a plate 250 that has an open end dimension that is the same size or smaller than the cable diameter rotates by the cable, the open ends 252 of each lobe 220 will lock against the sides of the cable 10. At this point, the cable 10 can be pulled no further in the clamping direction X2 and any greater tension on the cable 10 in the clamping direction X2 will result in a greater clamping force exerted on the cable 10 by the plates 250 of the lobes 220. Once this condition is reached, the cable 10 can be characterized as being in an attached or secured position. This securing action could also be referred to as a self-locking or self-retaining feature, achieved by pull or spring loaded lobes, or by other means. If it is desired to remove the cable 10 from the universal cable attachment 200, the operator can push the cable 10 in the insertion direction X1 to unclamp the cable 10 and can then hold the lobes 220 such that they cannot rotate in the closing direction while simultaneously pulling the cable 10 in the clamping direction X2.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:
1. A universal cable attachment for securing a cable in a secured position, the universal cable attachment including:
  a. a fixture;
  b. a first lobe rotatably mounted to the fixture, the first lobe defining a first channel within a main body of the first lobe; and
  c. a second lobe rotatably mounted to the fixture, the second lobe defining a second channel within a main body of the second lobe, the second lobe being identical to the first lobe and being oppositely arranged with the first lobe such that the first channel faces the second channel to define a cable retaining space;
  d. wherein when the first and second lobes rotate in an insertion direction, the cable retaining space increases in dimension and when the first and second lobes rotate in a clamping direction opposite the insertion direction, the cable retaining space decreases in dimension;
  e. wherein the fixture is a housing defining an interior cavity within which the first and second lobes are disposed; and f. wherein the housing includes a first aperture for receiving the cable, the aperture being coaxially aligned with the cable retaining space defined by the first and second channels;

g. further including a guide structure located within the interior cavity of the housing and between the first aperture and the first and second lobes, the guide structure including a second aperture coaxially aligned with the first aperture.

2. A universal cable attachment for securing a cable in a secured position, the universal cable attachment including:
   a. a fixture;
   b. a first lobe rotatably mounted to the fixture, the first lobe defining a first channel within a main body of the first lobe; and
   c. a second lobe rotatably mounted to the fixture, the second lobe defining a second channel within a main body of the second lobe, the second lobe being identical to the first lobe and being oppositely arranged with the first lobe such that the first channel faces the second channel to define a cable retaining space;
   d. wherein when the first and second lobes rotate in an insertion direction, the cable retaining space increases in dimension and when the first and second lobes rotate in a clamping direction opposite the insertion direction, the cable retaining space decreases in dimension;
   e. wherein each of the first and second channels extends from a first end to a second end; and
   f. wherein each of the first and second channels defines a first depth at the first end and a second depth at the second end, wherein the first depth is less than the second depth.

3. The universal cable attachment of claim 2, wherein each of the first and second channels defines a first width at the first end and a second width at the second end, wherein the first width is less than the second width.

4. A universal cable attachment for securing a cable in a secured position, the universal cable attachment including:
   a. a fixture;
   b. a first lobe rotatably mounted to the fixture, the first lobe defining a first channel within a main body of the first lobe; and
   c. a second lobe rotatably mounted to the fixture, the second lobe defining a second channel within a main body of the second lobe, the second lobe being identical to the first lobe and being oppositely arranged with the first lobe such that the first channel faces the second channel to define a cable retaining space;
   d. wherein when the first and second lobes rotate in an insertion direction, the cable retaining space increases in dimension and when the first and second lobes rotate in a clamping direction opposite the insertion direction, the cable retaining space decreases in dimension; and
   e. wherein each of the first and second lobes defines an outer surface having a cam-type shape with an elongated portion and a generally cylindrical portion, wherein the elongated portions of the first and second lobes provide a rotational stop for the first and second lobes.

5. The universal cable attachment of claim 4, wherein each of the first and second channels extends from a first end proximate the elongated portion to a second end remote from the elongated portion.

6. The universal cable attachment of claim 5, wherein each of the first and second channels defines a first depth at the first end and a second depth at the second end, wherein the first depth is less than the second depth.

7. The universal cable attachment of claim 6, wherein each of the first and second channels defines a first width at the first end and a second width at the second end, wherein the first width is less than the second width.

8. A method of securing a cable, the method including:
   a. inserting a cable in an insertion direction between a pair of contacting counter-rotating lobes, thereby causing the pair of lobes to rotate in an opening direction which allows the cable to be inserted past the pair of lobes without restriction; and
   b. pulling the cable in a clamping direction opposite the insertion direction to cause the pair of lobes to rotate in a direction opposite the opening direction and causing the pair of lobes to clamp against the cable to prevent the cable from being further pulled in the clamping direction;
   c. wherein the step of inserting the cable includes inserting the cable between a pair of plates disposed within the pair of lobes, wherein each of the pair of plates has an open end that clamps against the cable when the cable is pulled in the clamping direction.

9. The method of securing a cable of claim 8, wherein the step of inserting the cable includes inserting the cable into a pair of channels defined within the pair of lobes, wherein each of the pair of channels has a tapered shape that eccentrically orients the channel about an axis of rotation of the lobe associated with the channel, and wherein the pair of channels clamps against the cable when the cable is pulled in the clamping direction.

10. A universal cable attachment for securing a cable in a secured position, the universal cable attachment including:
    a. a fixture defining a fixed counter surface;
    b. a lobe rotatably mounted to the fixture opposite the fixed counter surface, the lobe and counter surface together defining a cable retaining space;
    c. wherein when the lobe rotates in an insertion direction, the cable retaining space increases in dimension and when the lobe rotates in a clamping direction opposite the insertion direction, the cable retaining space decreases in dimension;
    d. wherein the lobe includes a channel and the channel and the fixed counter surface defines the cable retaining space; and
    e. wherein the channel extends from a first end to a second end and defines a first depth at the first end and a second depth at the second end, wherein the first depth is less than the second depth.

11. The universal cable attachment of claim 10, wherein the channel defines a first width at the first end and a second width at the second end, wherein the first width is less than the second width.

12. A universal cable attachment for securing a cable in a secured position, the universal cable attachment including:
    a. a fixture defining a fixed counter surface;
    b. a lobe rotatably mounted to the fixture opposite the fixed counter surface, the lobe and counter surface together defining a cable retaining space;
    c. wherein when the lobe rotates in an insertion direction, the cable retaining space increases in dimension and when the lobe rotates in a clamping direction opposite the insertion direction, the cable retaining space decreases in dimension;
    d. wherein the lobe includes a first plate having a first open end and wherein the first open end and the fixed counter surface define the cable retaining space such that when the lobe rotates:

i. in an opening direction, the first and second plate open ends rotate away from each other to allow a cable to be inserted past the first and second open ends; and ii. in a clamping direction opposite the opening direction, the first and second plate open ends rotate towards each other to clamp against an inserted cable.

13. The universal cable attachment of claim 12, wherein the first plate is a separate component respectively inserted into a main body of the lobe.

14. The universal cable attachment of claim 12, wherein the first plate includes a first plurality of plates.

15. The universal cable attachment of claim 14, wherein each of the first plurality of plates has an open end of a different dimension than the remainder of the first plurality of plates.

16. The universal cable attachment of claim 15, wherein the first plurality of plates includes four first plates, wherein all of the plates are formed separately from a main body of the lobe.

17. The universal cable attachment of claim 14, wherein each of the first plurality of plates is inserted into a first channel defined within a main body of the lobe.

* * * * *